March 4, 1924.
E. N. FALES
1,485,775
FOLDING CHASSIS FOR AIRCRAFT
Filed March 9, 1922
2 Sheets-Sheet 2
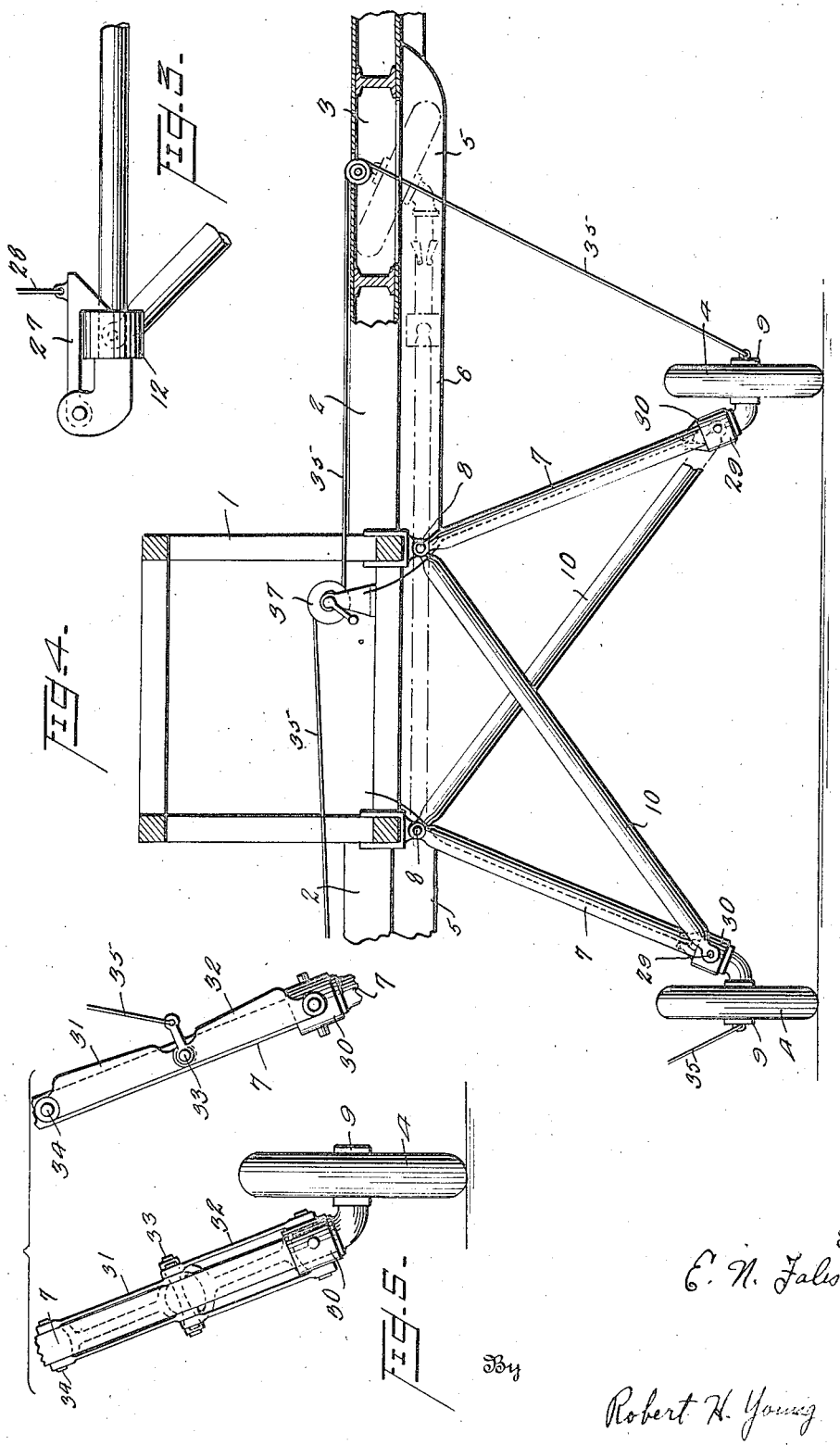
Inventor
E. N. Fales
By Robert H. Young, Attorney Patented Mar. 4, 1924.

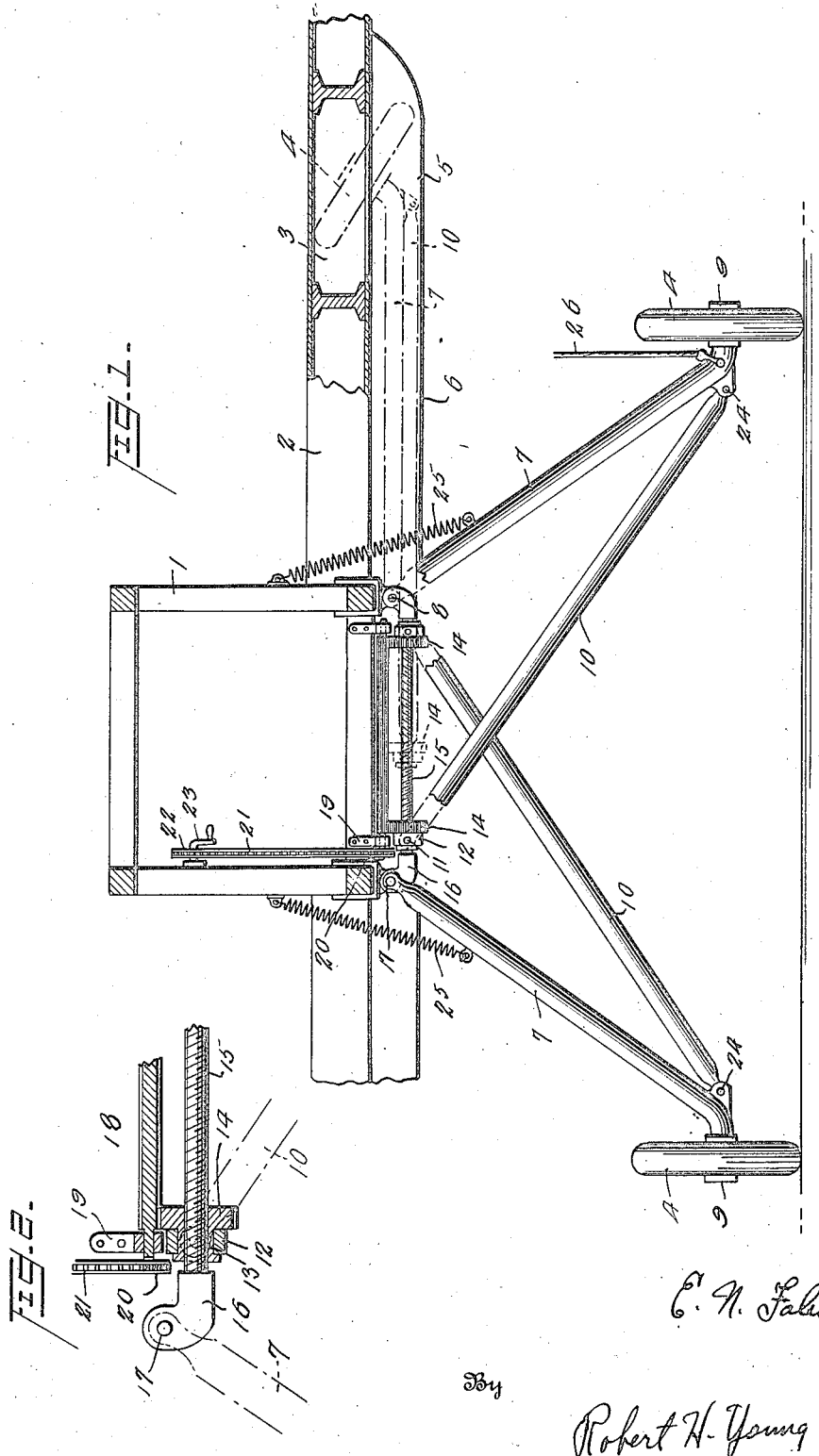

1,485,775

UNITED STATES PATENT OFFICE.

ELISHA N. FALES, OF DAYTON, OHIO.

FOLDING CHASSIS FOR AIRCRAFT.

Application filed March 9, 1922. Serial No. 542,421.

*To all whom it may concern:*

Be it known that I, ELISHA N. FALES, a citizen of the United States, residing at Dayton, in the county of Montgomery and State of Ohio, have invented certain new and useful Improvements in Folding Chassis for Aircraft, of which the following is a specification.

This invention relates to aircraft and particularly to the landing gear or chassis, the object of the invention being to produce a practicable, reliable and efficient retractable or foldable chassis which is light in construction, and offers a minimum amount of head resistance, both in its useful position and in its retracted or folded position, combined with means operable manually by the aviator whereby the chassis may be easily and quickly shifted to either of its two positions.

A further object of the invention is to provide a chassis or landing gear of the class referred to in which the usual low down axle which extends between the wheels is entirely eliminated, thereby avoiding the danger of the machine nosing over while making its initial run preparatory to taking off or when landing and rolling while decreasing its speed preparatory to a complete stop.

A further object of the invention is to provide a landing gear of the type referred to in which the usual wires or stays are eliminated and the head resistance incident to the use of such wires or stays.

With the above and other objects in view, the invention consists in the novel construction, combination and arrangement herein fully described, illustrated and claimed.

In the accompanying drawings:

Figure 1 is a front elevation of the improved chassis shown in its applied relation to the fuselage and wings of an airplane, said fuselage and wings being broken away in section for better illustration.

Figure 2 is an enlarged fragmentary detail section showing the connection between the upper end portion of one of the struts and the fuselage.

Figure 3 is a similar view showing modified means for locking the sliding connection between the strut and fuselage.

Figure 4 is a view similar to Figure 1 showing a slightly modified form of chassis.

Figure 5 is a fragmentary elevation showing one form of means for locking and unlocking the sliding connection of the strut under the arrangement illustrated in Figure 4.

Referring to the drawings, 1 designates the fuselage of an airplane and 2 the wings, shown extending in opposite directions from the fuselage and arranged at opposite sides thereof.

In carrying out the present invention, each of the wings is formed in the under side thereof with a pocket 3 of suitable size and shape to receive one of the wheels 4 of the landing gear or chassis. It is desirable that the pocket be of such size as to entirely house in the respective wheel of the chassis so that said wheel when in its folded position will cause no head resistance whatever while the machine is in flight. Where the wing is of insufficient thickness in cross-section, fairing 5 may be added to the wing for the purpose of increasing the thickness thereof to completely cover and shield or house in the wheel 4, as illustrated in the drawings, and said fairing 5 may be extended as shown at 6 to also house in and shield the supporting legs and struts of the chassis.

In conjunction with each of the wheels 4 of the chassis, I employ a leg 7 which is usually of V-formation, or in other words comprising fore-and-aft members which diverge from the wheel upwardly toward the fuselage 1. The leg 7 inclines from the wheel upwardly and inwardly and is connected to the fuselage by means of a pivot or hinge pin 8 extending in a fore-and-aft direction, whereby the leg is adapted to be swung laterally on a normally horizontal axis. The lower end of the leg 7 terminates in a wheel spindle 9, upon which the adjacent wheel 4 is ordinarily journaled.

In connection with each of the legs 7 I further employ a bracing strut 10 which diverges from the wheel 4 upwardly toward the chassis. Under the arrangement shown in Figure 1, the upper end of the strut 10 is connected by a pivot 11 to a sleeve or loose collar 12 surrounding a tubular extension or sleeve 13 projecting laterally from a gear wheel 14, the latter being internally threaded and engaging a non-rotary threaded rod or shaft 15. The opposite extremities of the rod 15 are supported by brackets 16 secured by fastening means 17 to the fuselage.

Located above and meshing with the gear wheels 14 for the oppositely extending braces 10 of the two wheels 4, is a barrel pinion 18, the opposite extremities of which are journaled in bearings 19 on the under side of the fuselage. On one end of the barrel pinion 18 is a sprocket wheel 20. Around the sprocket wheel 20 passes a chain 21 extending upwardly over another sprocket wheel 22 operated by a crank-handle 23, shown as arranged inside of the fuselage within convenient reach of the aviator, who by turning the crank in the proper direction causes the wheels 4 and the legs 7 and struts 10 to either swing upwardly to the housed or folded position, or downwardly to the useful position. It will be understood that as the pinion 18 is rotated, it imparts rotary motion to the gears 14, and by reason of the rod 15 having right and left hand threads at opposite sides of the center thereof, said gears 14 will be caused to move either toward each other or away from each other. In moving toward each other, the upper ends of the struts 10 are forced toward the respective legs 7 which they brace, and by reason of the struts 10 being connected to the lower ends of the legs 7 by pivots 24, the legs 7 are caused to swing outwardly and upwardly until the wheels 4 are housed within the pockets in the wings and the legs 7 and struts 10 housed within the fairing extensions 6. By reversing the direction of rotation of the pinion 18, the operation just referred to is reversed and the parts of the chassis are restored to their supporting positions. If desired, auxiliary means, such as springs 25 interposed between the legs 7 and the fuselage 1, may be used to assist in the upward swinging movement of the members of the chassis.

In lieu of the operating means hereinabove described, the opposite portions of the folding chassis may be raised by means of cables 26 leading around suitable guide pulleys into the fuselage, where they may be wound upon one or more drums operable by the aviator. In such case, when the struts 10 are in their bracing positions, the upper ends thereof may be locked by means of latches 27, one of which is shown in Figure 3, each latch being adapted to engage the respective collar or sleeve 12 above referred to and being adapted to be lifted for releasing the collar 12 by means of a lifting cord or cable 28, indicated in Figure 3. The latch 27 is adapted, when the cable 28 is relaxed, to automatically engage the collar 12, as shown in Figure 3.

Instead of placing the sliding connection between the upper end of the strut 10 and the fuselage as shown in Figure 1, said sliding connection may be placed between the strut 10 and the adjacent leg 7, as shown in Figure 4. For that purpose the lower end of each strut 10 is connected by means of a pivot 29 to a slide collar 30, movable along the leg 7, and in this case the sliding connection between the strut and the leg may be locked by any suitable means, such for example as toggle links 31 and 32 pivotally connected together at 33, the link 32 being connected by a pivot to the slide collar 30 and the other link 31 being connected by a pivot 34 to the leg 7. A cable 35 is connected to the pivot 33 and extends upwardly over suitable guide pulleys 36 to a drum 37 in the fuselage. This enables the aviator to raise and lower the fuselage members in order to accomplish the same results hereinabove set forth in connection with Figure 1. The main point of difference between Figure 1 and Figure 4 resides in the location of the sliding connection between each strut 10 and the respective leg 7, the sliding connection in Figure 1 being shown at the upper end of each strut; while in Figure 4 the sliding connection is shown at the lower end of each strut. In both cases, by reason of such sliding connection, both the strut and leg are caused to swing upwardly and downwardly and also laterally with respect to the fore and aft axis of the fuselage.

What is claimed is:

1. An aircraft embodying a fuselage, and wings having pockets therein, in combination with a folding chassis comprising wheels, legs extending from the wheels to the fuselage and pivoted to the latter to swing laterally, struts having a jointed connection with the legs and fuselage and having a slidable connection at one end, and means for locking and releasing said slidable connection.

2. An aircraft embodying a fuselage, and wings having pockets therein, in combination with a folding chassis comprising wheels, legs extending from the wheels to the fuselage and pivoted to the latter to swing laterally, struts having a jointed connection with the legs and fuselage and having a slidable connection at one end, manually-operable means for swinging the legs and struts to house the wheels in said pockets in the wings or move them to their supporting positions, and means for locking and releasing said slidable connection.

3. An aircraft embodying a fuselage, and wings having pockets therein, in combination with a folding chassis comprising wheels, legs extending from the wheels to the fuselage and pivoted to the latter to swing laterally, struts having a jointed connection with the legs and fuselage and having a slidable connection at one end, manually-operable means for swinging the legs and struts to house the wheels in said pockets in the wings or move them to their supporting positions, and means for locking and releasing said slidable connection, the wings having fairings which streamline in said legs and struts when the wheels are housed in their pockets in the wings.

In testimony whereof I affix my signature.

ELISHA N. FALES.